June 6, 1939.  A. V. BOGGILD  2,161,611

FASTENER

Original Filed April 24, 1934

Inventor:
Axel V. Boggild,
by Harry E. Dunham
His Attorney.

Patented June 6, 1939

2,161,611

UNITED STATES PATENT OFFICE 2,161,611

FASTENER

Axel V. Boggild, Trumbull, Conn., assignor to General Electric Company, a corporation of New York Original application April 24, 1934, Serial No. 722,078. Divided and this application December 14, 1937, Serial No. 179,713

18 Claims. (Cl. 85—47)

This application is a division of my application Serial No. 722,078 filed April 24, 1934.

The present invention relates to self-tapping screws or fasteners.

In the manufacture of electric wiring devices, it has become a recent practice to secure metal parts to parts of insulating material by a force or drive fit between the metal and the member of insulating material. This practice is of interest because of its relatively low cost as compared with the old practice of molding metal inserts in the part of insulating material into which screws could be threaded to secure a metal part to the member of insulating material. However, this practice is not entirely satisfactory because there is a tendency to break or fracture the member of insulating material frequently. Another practice has been somewhat developed of late which consists in molding or drilling an opening in the member of insulating material and then securing a metal part to it by means of a tap screw which will cut its own thread into the member of insulating material and will secure the metal part to it. This latter practice is quite satisfactory except for the relative high cost of the tap screw. The high cost of the tap screw is due to the necessity of first providing a thread on the screw and then milling longitudinal grooves in the screw to make the screw self-tapping.

The object of my invention is to provide a self-tapping screw which may be manufactured at no greater cost than an ordinary screw and which will work efficiently and satisfactorily as a self-tapping screw for securing metal parts to members of insulating material.

What I consider to be novel and my invention will be better understood by reference to the following specification and appended claims when considered in connection with the accompanying drawing.

Figure 1:
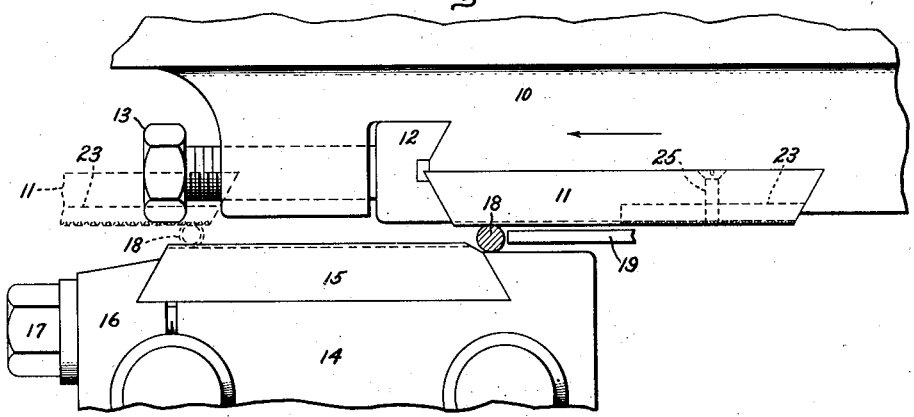
Figure 2:
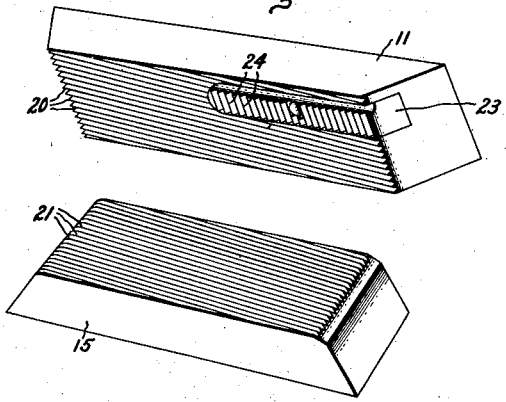
Figure 3:
Figure 4:
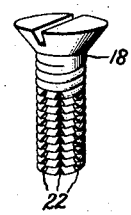

Referring to the drawing, Fig. 1 is a plan view of an improved machine for manufacturing self tapping screws; Fig. 2 is a perspective view of the dies mounted in the machine of Fig. 1; Fig. 3 is a perspective view of an insert located in one of the dies of Fig. 2 and Fig. 4 shows in perspective a self-tapping screw manufactured in accordance with my invention.

By my invention a self tapping screw is provided which is manufactured by rolling a thread and longitudinal grooves in the shank of the screw simultaneously.

Referring particularly to Fig. 1, a reciprocating slide 10 carries a die 11 which is held in the slide by means of a clamp 12. Clamp 12 may be loosened or tightened by means of stud 13. An adjustable holder 14 carries a stationary die 15 which is held in position by a clamp 16 which may be loosened or tightened by means of stud 17.

In the manufacture of a screw, a rod or screw blank 18 is placed adjacent the right hand end of stationary die 15. As the die 11 moves to the left with reciprocating slide 10, a starter rod 19 moves the rod or screw blank 18 to the left on the surface of die 15. Rod 18 is then gripped by the moving die 11 and rotated across the face of die 15. In the movement of the rod across the face of die 15 a thread is rolled on the rod. In the movement of the die 11 the rod 18 is rotated and so the die moves faster than the rod. The right hand end of the moving die 11 is shown in dotted lines just as the rod 18, which is also shown in dotted lines, passes from the left hand end of die 15. The threaded rod or screw blank 18 then passes to a receiving receptacle which is not shown on the drawing. As better indicated in Fig. 2, dies 11 and 15 are provided with angular grooves 20 and 21 respectively which form the thread on the rod 18 as it rolls between the two dies with the movement of die 11. To form longitudinal grooves 22 in the screw shown in Fig. 1 to make the screw self-tapping, an insert 23 is provided in die 11 which has transverse grooves 24. Insert 23 is secured in a slot provided in die 11 adjacent the right hand end by a screw 25 as indicated in dotted lines in Fig. 1. As the screw 18 rolls across the face of die 15 in engagement with die 11, the threads are formed in the shank of the screw. When the portion of die 11 carrying insert 23 first engages the screw 18, the longitudinal grooves are formed in the shank of the screw. The grooves 21 in die 15 serve to clean up any deposit of metal or burs raised by engagement of the insert 23 with the screw 18 upon the continued relative movement of die 11 with respect to the screw 18 and die 15. In the movement of the screw 18 with respect to the insert 23, the longitudinal grooves 22 are formed at spaced intervals completely around the circumference of the screw. The number of these grooves 22 and their spacing is determined by the use to which the screw is to be placed and may be varied at will by the substitution of a different insert 23.

From the foregoing, it may be seen that a self-tapping screw with a rolled thread and longitudinal grooves is provided which may be manufactured at no greater cost than the manufacture of the ordinary screw.

Not only is the screw formed by the above method lower in cost but in actual use it has been found superior to prior art self-tapping screws. For example, it can be threaded into thinner wall sections of moded insulating material without breaking the walls. This is due to the fact that the ribs forming the threads and the intersecting grooves forming the interruptions providing the abrupt shoulders or cutting edges are rolled from the material of the rod 18 during which process the fibers of the metal are not cut or severed but are compressed, resulting in increased density of the metal. The material forming the grooves 22 is not cut away from the threads but is compressed during the rolling process into the body of the blank 18 and into the surrounding threads, so that the surfaces of the grooves 22 and the resulting edges on the ends of the threads are smooth and free from burrs and have increased density due to the compression of the metal. Since the fiber of the metal is not cut, the threads, and particularly the cutting edges of the threads adjacent the grooves, have increased strength and hardness. The simultaneous rolling of the threads and grooves also forms these cutting edges without burrs.

By determining the grain structure of the metal, it is possible to determine whether the threads and grooves have been formed by rolling or whether the grooves have been formed by slotting, as in the prior art.

What I claim as new and desire to secure by Letters Patent of the United States, is:

1. In an article of manufacture a screw having a rolled thread and rolled longitudinal grooves interrupting the threads.

2. A fastener comprising a body having a rolled thread thereon and intersecting rolled longitudinal grooves, providing cutting edges on the thread.

3. A fastener having a body provided with a thread and intersecting longitudinal grooves, the metal forming the thread and grooves being formed by rolling the fastener body between dies having projections fitting in the longitudinal and thread grooves and squeezing metal from the body to form the threads and grooves.

4. A fastener comprising a body having a thread and intersecting grooves simultaneously rolled thereon.

5. A fastener comprising a body and a thread thereon, the thread being intersected by grooves extending along the body across the thread to provide abrupt cutting shoulders and having the material of the thread and body along the surface of the grooves compressed and kneaded as by the formation of the grooves by rolling.

6. A fastener comprising a body and a thread thereon, the thread being intersected by grooves extending along the body across the thread to provide abrupt cutting edges, and the surfaces of the thread at the cutting edges being more compact than the other portions of the body, as by being compressed and intersected by a rolling operation.

7. A fastener comprising a body having a thread thereon and grooves intersecting the thread and providing cutting edges formed with the material of the walls compressed and providing finished surfaces for the edges and unbroken fiber of the material of the body about the edges.

8. A fastener comprising a body having a thread and a groove intersecting the thread and providing cutting edges formed with the material of the walls compressed and providing finished surfaces for the edges and unsevered fiber of the material of the body about the edges.

9. A fastener comprising a body having an outstanding thread-like rib thereon having an interruption in its length providing cutting edges, the surfaces of the rib at the cutting edges being more compact than other portions of the body as by being compressed and intersected by a rolling operation.

10. A fastener comprising a body having an outstanding thread-like rib thereon having an interruption in its length providing cutting edges, the material of the rib and body along its length and at the cutting edges being compressed and kneaded as by rolling.

11. A fastener having a body provided with a thread-like rib having an interruption in its length forming cutting edges, the metal forming the rib and the interruption being formed by squeezing the metal from the body and the rib to form the rib and the interruption.

12. A fastener comprising a body having a thread-like rib thereon with an interruption in its length, the rib and the interruption being simultaneously rolled thereon.

13. A fastener comprising a body having outstanding thread-like ribs having interruptions in the length providing cutting edges, the material displaced by the interruptions being compressed and flowed into the body and the edges of the ribs providing cutting edges of relatively dense material.

14. A fastener comprising a body having outstanding thread-like ribs having interruptions in the length providing cutting edges, the interruptions being formed by rolling whereby the metal displaced is compressed and flowed into the body and the edges of the ribs providing cutting edges of relatively great density.

15. A fastener comprising a body and a thread thereon, the thread being intersected by grooves extending along the body across the thread to provide abrupt cutting shoulders, the broken thread sections and the cutting shoulders having the characteristics of compactness and smoothness produced by repeatedly subjecting the same parts alternately to thread pressing and groove pressing operations.

16. A fastener comprising a body and a thread thereon, the thread being intersected by grooves extending along the body across the thread to provide abrupt cutting shoulders, the broken thread sections and cutting shoulders having the characteristics of compactness and smoothness incident to the thread and grooves being simultaneously rolled into the fastener.

17. A fastener comprising a body having an outstanding thread-like rib having an interruption in its length providing cutting shoulders, the broken thread sections and the cutting shoulders having the characteristics of compactness and smoothness produced by repeatedly subjecting the same parts alternately to thread pressing and groove pressing operations.

18. A fastener comprising a body having an outstanding thread-like rib having an interruption in its length providing cutting shoulders, the broken thread sections and the cutting shoulders having the characteristics of compactness and smoothness incident to the thread and grooves being simultaneously rolled into the fastener.

AXEL V. BOGGILD.